(12) United States Patent
Raguse et al.

(10) Patent No.: US 6,984,265 B1
(45) Date of Patent: Jan. 10, 2006

(54) THREE DIMENSIONAL ARRAY FILMS

(75) Inventors: Burkhard Raguse, Gordon (AU);
Vijoleta Lucija Bronislava Braach-Maksvytis, Marrickville (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 581 days.

(21) Appl. No.: 10/089,820

(22) PCT Filed: Oct. 5, 2000

(86) PCT No.: PCT/AU00/01210

§ 371 (c)(1),
(2), (4) Date: Jul. 31, 2002

(87) PCT Pub. No.: WO01/25316

PCT Pub. Date: Apr. 12, 2001

(30) Foreign Application Priority Data

Oct. 5, 1999 (AU) .................................... PQ3264

(51) Int. Cl.
*C30B 19/04* (2006.01)

(52) U.S. Cl. .............................. 117/73; 117/68; 117/78
(58) Field of Classification Search .................. 117/68, 117/73, 78
See application file for complete search history.

(56) References Cited

U.S. PATENT DOCUMENTS

| | | | | |
|---|---|---|---|---|
| 4,945,121 | A | * | 7/1990 | Micale et al. ............... 523/339 |
| 5,711,803 | A | | 1/1998 | Pehnt et al. |
| 6,129,786 | A | * | 10/2000 | Camara et al. ............. 106/499 |
| 6,533,855 | B1 | * | 3/2003 | Gaynor et al. ......... 106/287.14 |
| 6,592,844 | B2 | * | 7/2003 | Coombes et al. .......... 424/1.29 |
| 2002/0168408 | A1 | * | 11/2002 | Samain et al. .............. 424/484 |
| 2002/0182146 | A1 | * | 12/2002 | Coombes et al. .......... 424/1.29 |

FOREIGN PATENT DOCUMENTS

| | | |
|---|---|---|
| AU | 17433/97 A | 7/1997 |
| AU | 29947/99 A | 9/1999 |
| AU | 29947/99 A1 | 9/1999 |
| DE | 197 41 496 A | 3/1999 |
| DE | 19741496 A | 3/1999 |
| DE | 197 56 790 A1 | 7/1999 |
| DE | 19756790 A | 7/1999 |
| WO | WO 97/24224 | 7/1997 |
| WO | WO 99/46351 | 9/1999 |
| WO | WO 00/20916 | 4/2000 |

OTHER PUBLICATIONS

International Search Report for PCT/AU00/01210, dated Nov. 23, 2000.
International Preliminary Examination Report for PCT/AU00/01210. dated Aug. 21, 2001.
M. Musick et al., "Stepwise Construction of Conductive Au Colloid Multilayers from Solution"; Chem Mater. 1997, 9, pp. 1499-1501.

* cited by examiner

*Primary Examiner*—Robert Kunemund
(74) *Attorney, Agent, or Firm*—Christie, Parker and Hale, LLP

(57) ABSTRACT

The present invention provides nanoparticle film and methods of making such films. The nanoparticle film comprises a three dimensional cross-linked array of nanoparticles and linker molecules. The nanoparticle film is coherent, robust and self supporting. The film may be produced by adding linker molecules to a suspension of nanoparticles. The linker molecules form cross-links between the nanoparticles. Prior to completion of the cross-linking reaction the cross-linked nanoparticles are separated from the suspension.

38 Claims, 8 Drawing Sheets

THREE DIMENSIONAL ARRAY FILMS

CROSS-REFERENCE TO RELATED APPLICATION

Figure 1:
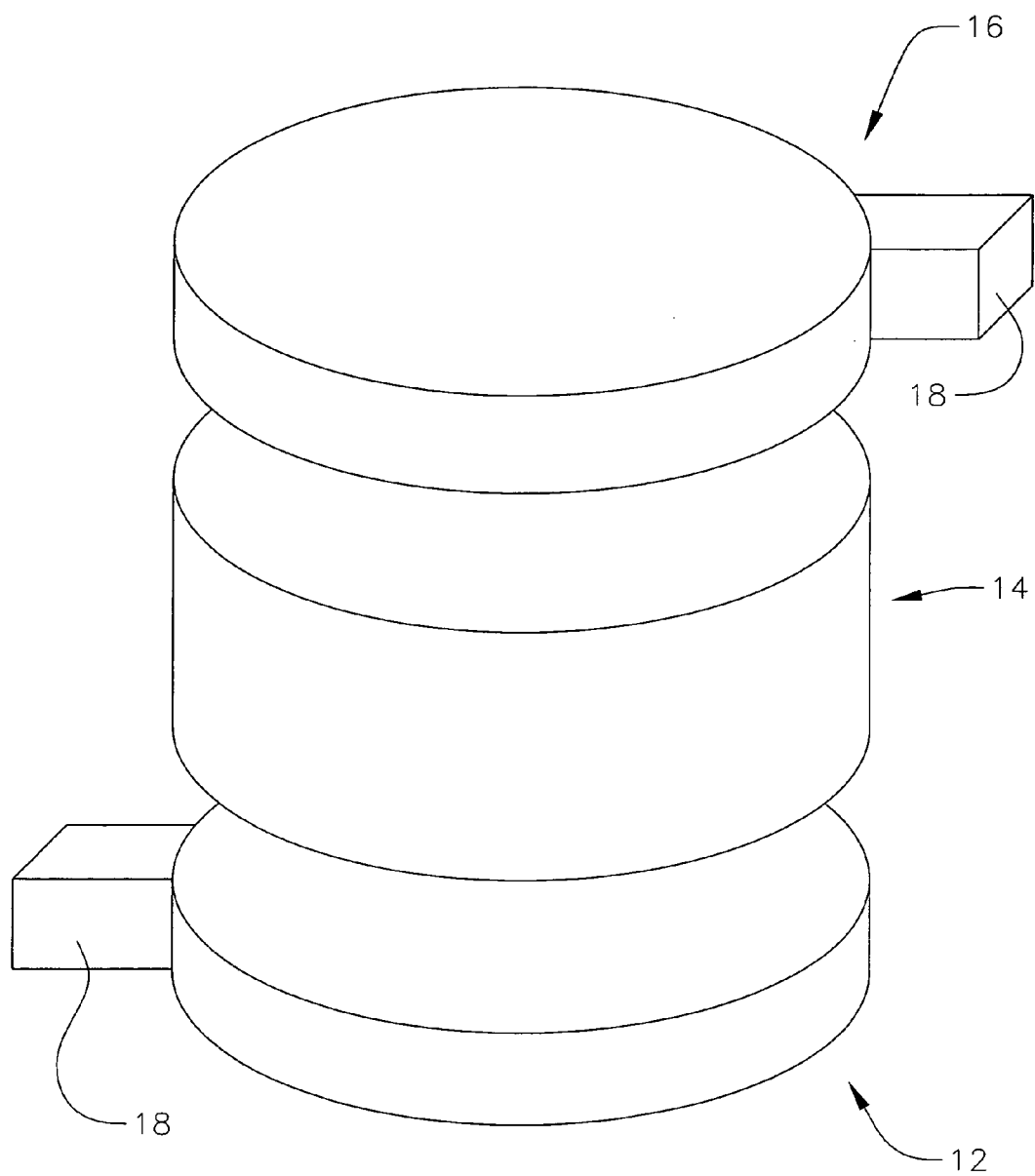

This application claims priority of International application number PCT/AU00/01210, filed Oct. 5, 2000, which in turn claims priority of Australian application number PQ 3264, filed Oct. 5, 1999.

FIELD OF THE INVENTION

The present invention relates broadly to nanoparticle films, in particular supported films, devices comprising such films and a method of forming such films.

BACKGROUND OF THE INVENTION

Nanoparticles are of fundamental scientific and technological importance as basic building blocks in nanotechnology and as components of novel materials. This is due to several unique features: their small size (1–100 nm) means the properties of these materials may be determined by quantum rather than classical physics; the ratio of surface atoms to bulk atoms is large so that surface physics is important in determining the material properties; the surface properties can be modified through self-assembled monolayer coatings; and they form structures in a size range (1–100 nm) that are not readily accessible through other physical or chemical techniques.

A large variety of nanoparticles have been chemically synthesised in the literature. Metallic e.g. Au, Ag, Pd, Pt, Cu, Fe, etc; semiconductor e.g. $TiO_2$, CdS, CdSe, ITO, etc; insulating e.g. $SiO_2$, organic etc; magnetic e.g. $Fe_2O_3$, Fe, etc; superconductor etc. Most synthetic procedures are relatively straight forward and many have been developed that yield relatively uniform nanoparticles (±10%) in a range of sizes. The size of the particle is determined by the stoichiometry of the components (the ions and the reducing agent), yielding what are essentially metal (or non-metal, etc depending on the starting materials) cores surrounded by chemical coatings. For example, 15 nm Au nanoparticles (used in the work reported here) can be made by reducing $Au^{3+}$ ions to metallic Au using sodium citrate as the reducing agent, by the following method: aqueous $HAuCl_4$ solution (1% w/v, 5 ml) is added to 500 ml water, heated to boiling, before adding sodium citrate (1% w/v, 12.5 ml). This is boiled for 15 min then cooled, yielding a wine-red solution of 15 nm gold nanoparticles. The colour of the colloidal solution is due to surface plasmon adsorption (~520 nm) of the Au nanoparticles. The adsorption frequency varies depending on the size of the nanoparticles and thus can be used to check the average size of the particles. The size of the particles can be varied from 2–60 nm by varying the ratio of $HAuCl_4$ to sodium citrate. Other methods exist for the formation of Au nanoparticles in non-polar solvents, which are required when using water insoluble cross-linking molecules.

Several methods have been reported in the literature for forming bulk nanoparticle materials. Drying down of colloidal gold solution droplets deposited onto substrates have produced ill-defined structures (Schmid, G.; Lehnert, A.; Kreibig, U.; Adamczyk, Z.; Belouschek, P. (1990) Z. Naturforsch., 45b, 989). Electrophoretic deposition has been reported to take advantage of the charge surrounding the nanoparticles in solution but these films are difficult to control, produce cracked films, and require conducting substrates (Giersig, M.; Mulvaney, P. (1993) J. Phys. Chem., 97, 6334). Films have also been produced by cross-linking nanoparticles with linkers, allowing the aggregates to precipitate, then compressing the bulk material into pellets. This method is non-uniform and has limited utility (Brust, M.; Bethell, D.; Schiffrin, D. J.; Kiely, C. J. (1995) Adv. Mater. 7, 795).

Successful conducting gold films made on glass supports by a monolayer by monolayer deposition, have been reported in the literature (Musick, M. D.; Keating, C. D.; Keefe, M. H.; Natan, M. J. (1997) Chem. Mater. 9, 1499). This "layer-by-layer" deposition begins by coating a substrate surface with charged (positive) groups. The substrate is then dipped into a solution of negatively charged Au nanoparticles which adsorb onto the positively charged surface. Due to the negative charge on the nanoparticles only a ~30% surface coverage is achieved. The dilute nature of the nanoparticle solutions means that this coating step takes 2–24 hours. The sodium citrate providing the negative charge on the nanoparticle is replaced in the next step by a cross-linker molecule which acts as a "glue" between the nanoparticles, e.g. a difunctionalised alkane such as HS—$(CH_2)_2$—SH. In this molecule, one sulfur group binds strongly to the gold, displacing the sodium citrate and neutralising the particle, leaving the second sulfur group exposed ready to bind the next layer of Au nanoparticles. This process takes a further 10–100 minutes. In between coatings, the surface must be rigorously washed to prevent precipitation of the nanoparticles. The procedure is repeated for as long as required in order to build up the multilayer structure. Films of 12 or more layers, using a two carbon cross-linker molecule, HS—$(CH_2)_n$—OH, have been shown to be conductive. Whilst this method is solution based and so may be automated it suffers from a number of disadvantages; the procedure is slow, can take several days and places a limit on the thickness of the films that can be realistically built, it yields amorphous structures, and uniformity depends on the uniformity of the initial substrate coating.

Previous literature work has reported that the conductivity of bulk nanoparticle materials formed from the above coated nanoparticles depends dramatically on the length or thickness of the cross-linker molecules, and hence the distance between the nanoparticles.

Table 1 gives the approximate values of resistivity for the various cross-linker molecules which have been reported in the literature. Note that these values were measured on nanoparticle materials made using different techniques (e.g. compressed pellets, layer-by-layer assembly, differing Au nanoparticle sizes, different laboratories, etc), hence comparisons should be made cautiously. However, it is apparent that small changes in the interparticle distance (0.4 to 2 nm), as determined by cross-linker length, results in large changes in resistivity (more than 10–12 orders of magnitude).

TABLE 1

Resistivity of films fabricated using different length cross-linking molecules. Note: caution should be used when comparing this literature data as the results were based on bulk materials fabricated using a different techniques.

| Linker | Linker length | Resistivity | Technique used to form bulk material |
|---|---|---|---|
| $HS(CH_2)_{16}SH$ | ~2 nm | ~$10^9$ Ω cm | Drop-cast film[a] |
| $HS(CH_2)_6SH$ | ~1 nm | ~10 Ω cm | Compressed pellet[b] |

TABLE 1-continued

Resistivity of films fabricated using different length cross-linking molecules. Note: caution should be used when comparing this literature data as the results were based on bulk materials fabricated using a different techniques.

| Linker | Linker length | Resistivity | Technique used to form bulk material |
|---|---|---|---|
| HS(CH$_2$)$_2$OH | ~0.4 nm | ~10$^{-4}$ Ω cm | Layer-by-layer[c] |
| bulk gold | — | ~10$^{-6}$ Ω cm | |

[a]Terril, R. H. et al (1995) J. Am. Chem. Soc., 117, 12537
[b]Brust, M. et al (1995) Adv. Mater., 7, 795
[c]Musick, D. et al (1997) Chem. Mater., 9, 1499.

Some models are just beginning to appear in the recent literature regarding the nature of the conduction observed in the bulk materials formed using nanoparticles. The size and large surface area of the nanoparticles determine the physics of these particles. When the wavelength of the electrons approaches the same order as the particle size, quantum mechanical rules apply. There are only a few published reports which discuss the behaviour of bulk materials formed from nanoparticles. Quantum confinement has been discussed for metal particles between 1 and 10 nm in size, and for semiconductor nanoclusters of larger sizes due to different conditions in the bulk (Schmid, Baumle, Geerkens, Heim, Osemann, Sawitowski (1999) Chem. Soc. Rev., 28, 179–185). A direct relationship between the gold nanoparticle spacing created by cross-linker molecules and the activation energy needed to start electronic tunneling via the linkers, from one nanoparticle to the next, has been reported (G. Schmid & L. F. Chi, (1998), Adv. Mater., 10, 515). Single-electron tunneling has been observed in individual single gold particles coated with a 3 nm thick self-assembled monolayer when measured using an STM tip (Yau, S.-T., P. Mulvaney, W. Xu, G. M. Spinks (1998) Phys. Rev. B, 57, 124–127). A report describing a "single electron transistor" discusses electron conduction exhibiting a Coulomb staircase occurring through the self-assembled monolayers of gold particle aggregates which were used to bridge a gap between the source and drain structures on a silicon dioxide substrate (T. Sato, H. Ahmed, D. Brown, B. Johnson (1997) J. Appl. Phys. 82, 696–701).

SUMMARY OF THE INVENTION

In a first aspect the present invention consists in a method of forming a coherent nanoparticle film, the method comprising the following steps:

(i) adding to a suspension of nanoparticles linker molecules which form cross-links between the nanoparticles to start a cross-linking reaction; and (ii) separating the cross-linked nanoparticles from the suspension prior to completion of the cross-linking reaction to obtain a coherent nanoparticle film.

It is preferred that the cross-linked nanoparticles are separated from the suspension by passing the suspension from step (i) through a porous support, such as a filtration membrane, prior to completion of the cross-linking reaction to form a coherent nanoparticle film on the porous support.

In a second aspect the present invention consists in a method of forming a multilayer film comprising at least two layers of coherent nanoparticle film, the method comprising the following steps:

(i) adding to a suspension of nanoparticles linker molecules which form cross-links between the nanoparticles to start a cross-linking reaction;

(ii) passing the suspension from step (i) through a porous support prior to completion of the cross-linking reaction to form a nanoparticle film on the porous support;

(iii) adding to a further suspension comprising nanoparticles linker molecules which form cross-links between the nanoparticles to start a cross-linking reaction;

(iv) passing the further suspension from step (iii) through the nanoparticle film of step (ii) and the porous support prior to completion of the cross-linking reaction to form a further nanoparticle film; and (v) optionally repeating steps (iii) and (iv).

It is preferred that the suspension is passed through the porous support under the influence of external pressure. If desired the nanoparticle film may be separated from the porous support. While this separation may be achieved by a number of means it is preferred that a release layer positioned between the porous support and the nanoparticle film.

In a third aspect the present invention consists in a nanoparticle film comprising a three dimensional cross-linked array of nanoparticles and linker molecules in which the nanoparticle film is coherent, robust and self supporting.

As used herein the term "coherent" is intended to convey that the nanoparticle film is continuous and does not include cracks or breaks which traverse the film.

As used herein the term "robust" is intended to convey that the nanoparticle film is capable withstanding the application of uniform or non-uniform pressure across the film without breaking. Uniform pressure may be applied by application of a smooth metal die to the film, whilst non-uniform pressure may be applied by application of an embossed or engraved metal die to the film. In this latter situation the inverse of the image on the die is transferred to film without causing breakage of the film. The term "robust" is also intended to convey that the film is flexible and may be flexed without cracking or breaking.

As used herein the term "self-supporting" is intended to convey that the nanoparticle film is capable retaining its coherent nature without the benefit of being supported on a solid substrate.

In preferred embodiments of the present invention the nanoparticles are formed from material selected from the group consisting of metallic, semiconducting, insulating, and magnetic materials. The nanoparticles may be formed from a wide range of materials including gold, copper, silver, platinum, palladium, iron, cobalt, cobalt-iron alloy, TiO$_2$, CdS, CdSe, ZnS, ZnSe, PbS, ZnO, CdTe, GaAs, InP, Si, indium tin oxide, and fluorine doped tin oxide nanoparticles. The nanoparticles in the films are preferably spherical, oblate spheroids, rod shaped or mixtures thereof.

In another preferred embodiment the nanoparticles are composite core-shell nanoparticles consisting of two or more different materials.

The linker molecules may any of a number of such molecules known in the field, however it is preferred that the linker molecules are selected from the group consisting of organodithiols, organodiamines, polymers, proteins, DNA, linker molecules containing polymerisable groups, enzymes, opto-electronically active compounds e.g. viologens, fullerene, pophyrins, chemically reactive molecules such as alkynes, molecules whose terminus can form links between linker molecule, e.g. H-bonding, to form a continuous nanoparticle to nanoparticle linker, phthalocyanines, spyropyrans, azobenzenes, anthracene derivative, fulgides, indigo derivatives, molecules with molecular conductivity properties such as oligo-benzoacetylenes, linear polyaromatic compounds.

In another preferred embodiment the linker molecule comprises at least two functional groups that bind to the nanoparticles and at least one functional group that changes conformation on exposure to an external stimulus or that changes the electronic state of the linker molecule to an external stimulus. It is preferred that the external stimulus is selected from the group consisting of ultraviolet, visible, infra-red, microwave, or ionizing radiation, chemical or physical interactions with molecules or ions, pH, reduction/oxidation reactions, electric or magnetic fields.

In a further preferred embodiment the nanoparticle films are formed into multilayer films comprising differing nanoparticles or linkers such that the multi-layer film has non-linear conduction properties.

In a still further preferred embodiment a metal die having lateral feature sizes ranging from centimeter to nanometre is contacted with the nanoparticle film and transfers an imprint or embossed structure onto the nanoparticle film.

In another embodiment the nanoparticle film is positioned on or within a solid substrate such as a banknote, credit card or security card.

In order to provide protection for the nanoparticle film, in a number of applications, it is preferred that a protective polymer layer is provided over the nanoparticle film.

DETAILED DESCRIPTION OF THE INVENTION

Figure Legends

FIG. 1. Shows a schematic drawing of a trilayer nanoparticle film formed according to Example 5, consisting in a first layer conductive gold nanoparticle film, a second layer non-conductive $TiO_2$ nanoparticle layer crosslinked with polyacrylic acid and a third layer conductive gold nanoparticle film. The schematic also shows the two tags to which the impedance spectrometer is attached.

Figure 2:
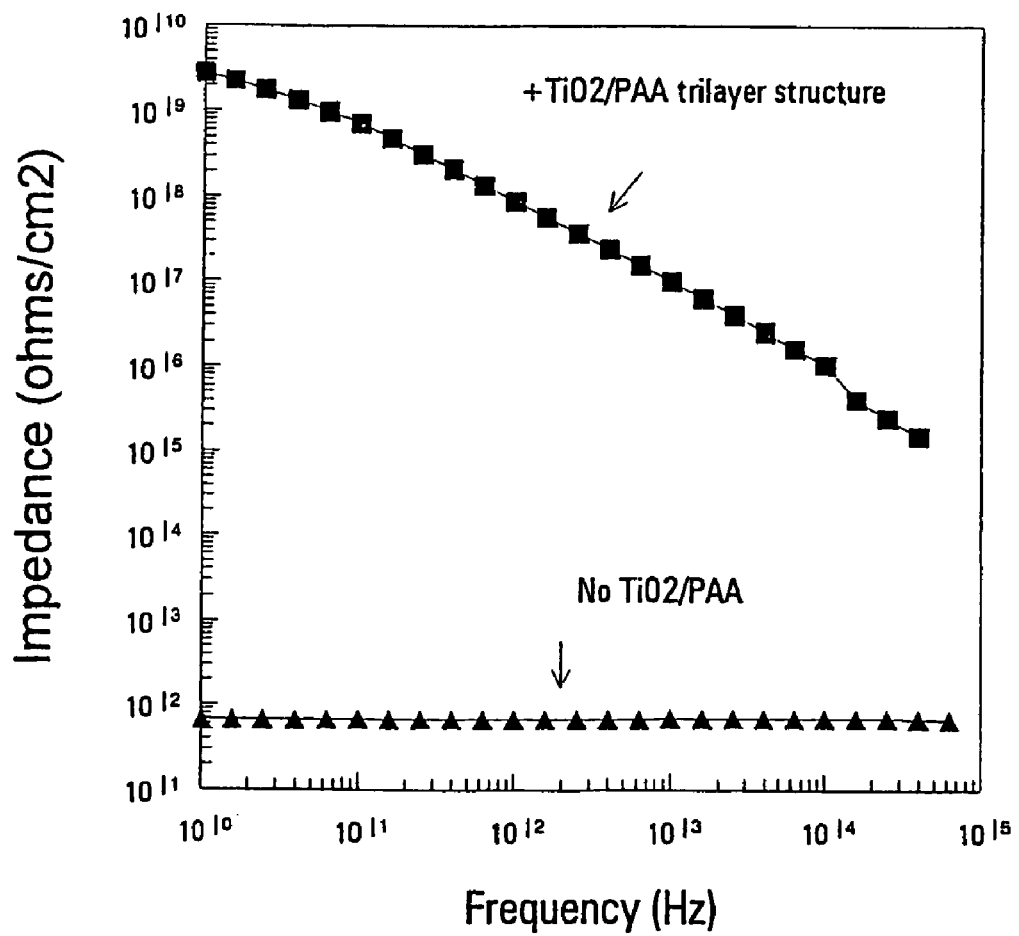

FIG. 2. Shows the impedance spectrum obtained from the hybrid structure formed according to Example 5. As can be seen the impedance with the TiO2/PAA layer is high, whereas in the absence of cross-linked TiO2 the two gold nanoparticle films form a short circuit FIG. 3. Shows the non-linear current-voltage behaviour of the patterned trilayer film formed according to Example 6

Figure 4:
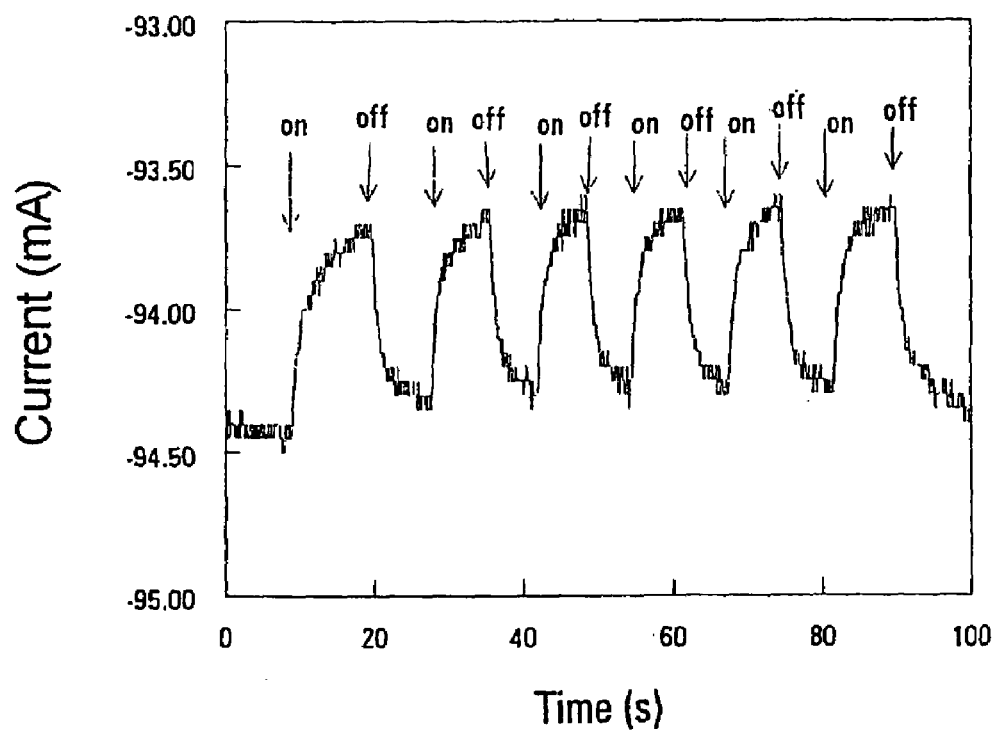

FIG. 4. Shows the photoconductivity response of nanoparticle films formed according to Example 7a. As can be seen the current decreases on illumination with light.

Figure 5:
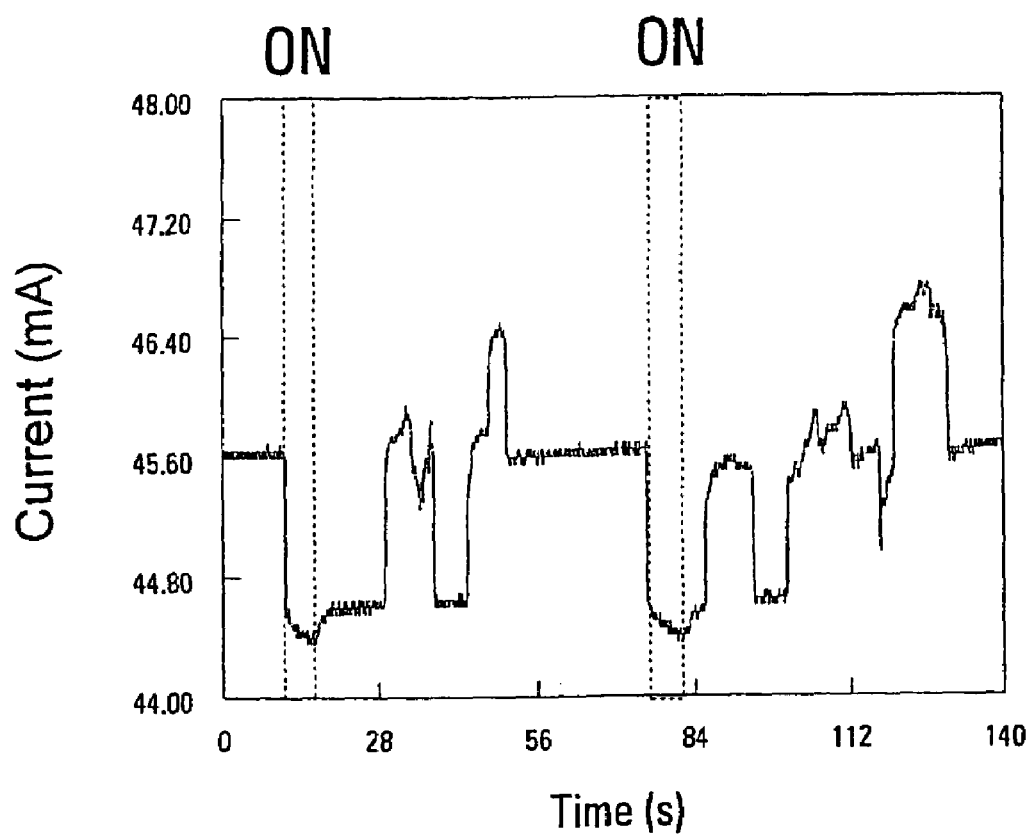

FIG. 5. Shows the photoconductivity response of nanoparticle films formed according to Example 7b. The step-like photoconductivity response of the films can be seen on exposure to light an dark FIG. 6. Shows the photoconductivity response of nanoparticle films formed according to Example 7c. Again incremental increases/decreases in photoconductivity are seen in the presence/absence of light.

Figure 6:
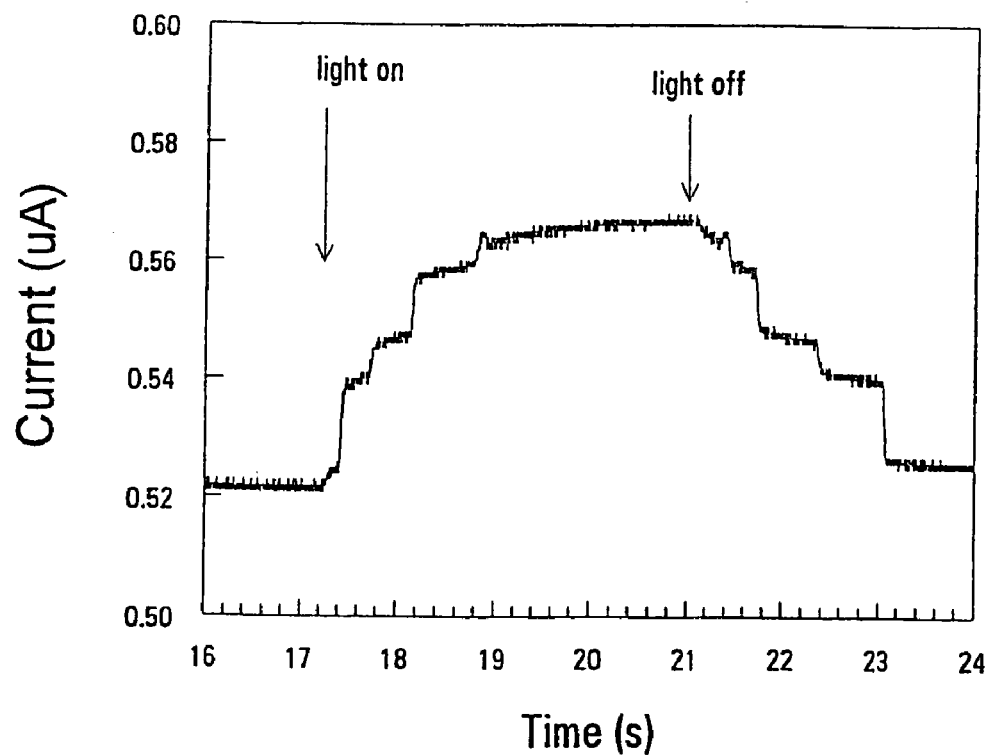
Figure 7:
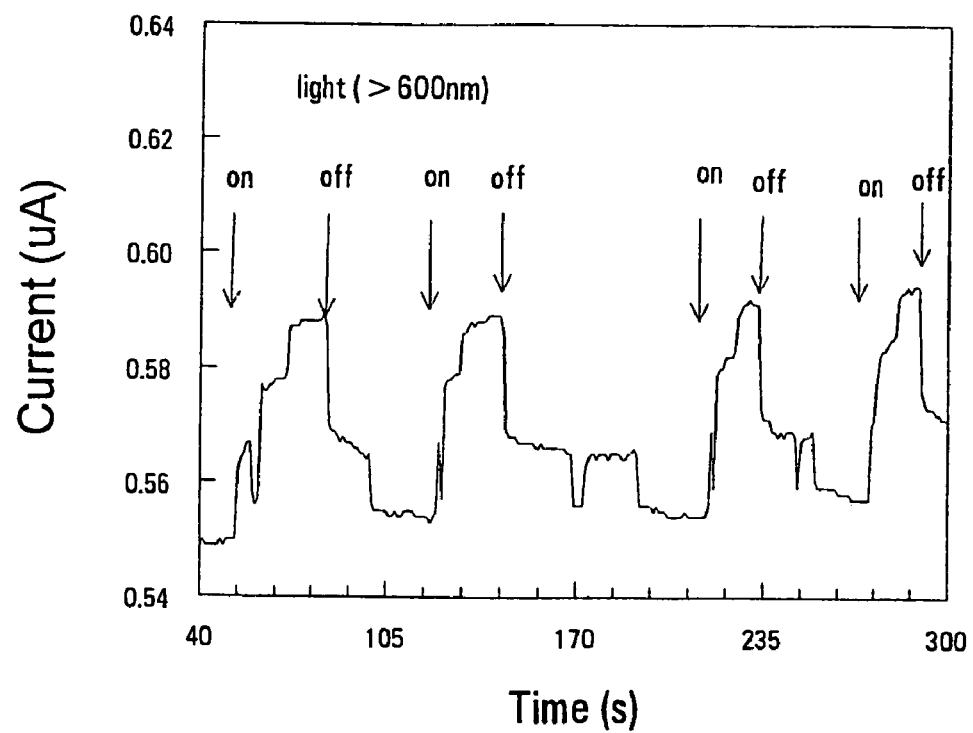

FIG. 7. Shows the photoconductivity response of the film shown in FIG. 6 but irradiating with light of wavelength>600 nm. As can be seen the profile of the conduction steps changes.

Figure 8:
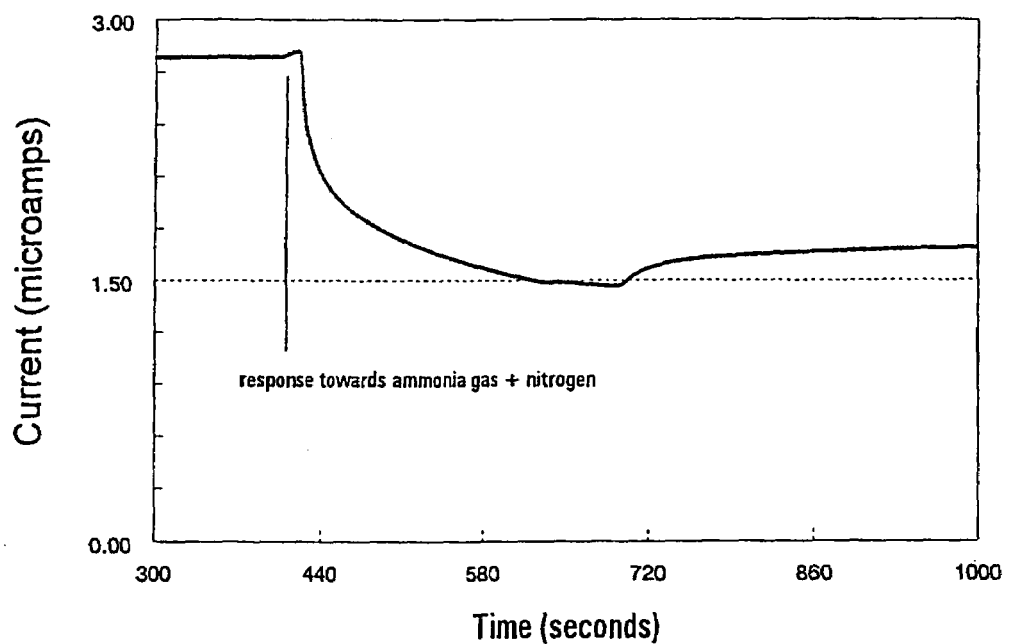

FIG. 8. Shows the response of a nanoparticle film formed according to Example 8 towards being exposed to a mixture of nitrogen and ammonia gas. As can be seen the conductivity decreases on exposure to the ammonia gas.

The present inventors have developed a technique for fabricating metal or non-metallic nanoparticle films. These films differ in respect of a number of important physical properties from previously described films. The process uses nanoparticles linked together through self-assembled cross-linker molecules. This technique not only overcomes a number of the limitations of previously described methods for bulk material fabrication from nanoparticles and produces films which exhibit properties similar to conventional bulk materials, but also allows the introduction additional novel properties of both scientific and commercial interest.

The technique combines a specific kinetic step in the aggregation process between the cross-linker molecules and the nanoparticles, with the separation of the cross-linked particles from the suspension prior to completion of the cross-linking reaction. This separation and the subsequent formation of a coherent nanoparticle film can be facilitated by the application of pressure, for example, solution flow through a nanoporous support whose pores are smaller than the size of the nanoparticle aggregates. Using this technique with, for example, gold nanoparticles results in flexible conductive films fabricated in minutes which display a reflective, metallic gold colour. The key components which can modify the properties of the resulting films are the nanoparticles, cross-linker molecules, nanoporous support and the solvent.

These films are constructed from nanoparticles separated by (or in some sense glued together by) individual cross-linker molecules terminating in active groups which bind to the surface of the gold particles. The cross-linker molecules are chosen specially so that they spontaneously form a self-assembled monolayer over the surface of the particles. Thus, by each attaching themselves to two nano-particles, the cross-linker molecules drive the self-assembly process and link the nanoparticles together. Some characteristics of the process are:

- the process is carried out before completion of the cross linking reaction; if the cross-linking reaction is allowed to go to completion then loose "powders" rather than coherent films are formed; conversely, if the cross-linking reaction is at an early stage, the nanoparticles will pass through the nanoporous membrane without film formation
- use of pressure before completion of the cross-linking facilitates the formation of long-range ordering of three-dimensional aggregates to produce a coherent, continuous, robust, solid film
- the kinetics of the cross-linking reactions is critical, and will vary with cross-linker species
- the overall film formation process is fast
- ~10 min for a 300 nm film
- ~2 hrs for a 3 micron film (NB an equivalent film thickness obtained by the literature layer-by-layer method would take 100 days)
- film thickness can be varied by varying the quantity of nanoparticle solution used
- gold nanoparticles form reflective metallic gold coloured films
- films remain porous, e.g. gold nanoparticle conductive films allow water to pass through the films Nanoparticle films have been fabricated using different nanoparticles. The resulting films maintain the properties of the equivalent bulk material, e.g. metal nanoparticles form conducting films if the distance between the nanoparticles allows electron transfer, non-metal nanoparticles form insulating films. The size of the nanoparticles used to fabricate the films can also modify the properties of the film.

The nanoparticle films may be formed from mixtures of different nanoparticles. In this case the cross-linker molecules are such that they contain binding sites to both types of nanoparticles. For instance in the case of gold and titanium dioxide nanoparticles a suitable crosslinker molecule would contain a thiol or disulfide group in order to bind to the gold nanoparticle and a carboxylic acid or phosphoric acid in order to bind to the titanium dioxide nanoparticle.

Cross-linking molecules are used to not only link the nanoparticles together but also to influence the physical and "active" properties of the nanoparticle films. The cross-linking molecules are designed to self-assemble around and between the nanoparticles and can incorporate a range of properties such as electro- or opto-activity, polar or nonpolar, etc., to modulate the final film properties. A range of cross-linkers have been used, including alkanediamines, alkanedithiols, electro/photo active viologens, C60 buckyballs, polymers, proteins.

The nanoporous membranes provide the supports for the nanoparticle films and selectively separate the cross-linked nanoparticles from the solvent. These membranes can be either fabricated or purchased, and are available in a wide range of pore sizes, materials, and sheet sizes, including papers and plastics. The supports used for the nanoparticle films also impart an additional novel property—the films produced remain porous. Different nanoporous substrates have been equally successful in creating the nanoparticle films, as measured by the conductivity of the resulting films.

The conduction of the gold nanoparticle films was found to be dependent on:
- type of cross-linker
- length of cross-linker
- size of the nanoparticle
- volume of nanoparticle solution
- concentration of nanoparticles
- dielectric property of the solvent used for the nanoparticle solution.

Thickness and Surface Area

The nanoparticle film thickness is determined by the quantity of Au nanoparticle solution that is filtered through the nanoporous support and by the concentration of Au nanoparticles in solution.

In order that the nature of the present invention may be more clearly understood preferred forms thereof will now be described with reference to the following non-limiting Examples.

EXAMPLE 1

Synthesis of Nanoparticles

Standard synthetic methods were used for the synthesis of nanoparticles. Typical methods may be found in publications such as: Clusters and Colloids, from Theory to Applications, G. Schmid (Ed.), 1994, VCH Publishers New York, USA; Nanoparticles and Nanostructured Films, J. H. Fendler (Ed.), 1998, Wiley-VCH. Unless otherwise specified water-soluble, sodium citrate coated gold nanoparticles of approximately 15 nm in size (hereafter known as Au20 gold nanoparticles) were synthesised according to the method of Schmitt, J. et al *Adv. Mater.*, 1997, 9(1), 61. Water-soluble, sodium citrate coated gold nanoparticles of approximately 2, 60 and 120 nm in size (hereafter known as Au2, Au60, Au120 gold nanoparticles respectively) were synthesised according to the method of Grabar, K. C. et al., *Langmuir*, 1996, 12, 2353. Tetraoctylammonium bromide coated gold nanoparticles of approximately 8 nm in size (hereafter known as Au8 gold nanoparticles), that were soluble in toluene solvent were prepared according to the method of Brust, M. et al, *Adv. Mater.*, 1995, 7(9); 795.

EXAMPLE 2

Formation of Supported Nanoparticle Films from Aqueous Solution on Porous Supports To an aqueous solution of Au20 gold nanoparticles (10 ml) was added 200 µl of a 10 mM solution of 2,2'-hydroxyethyl disulfide in water. The 2,2'-hydroxyethyl disulfide was used to cross-link the gold nanoparticles. The solution was mixed and left to cross-link for 10 minutes. During this time the colour of the solution changed from a wine-red colour to a blue-black colour but no visible precipitate had formed. After 10 minutes the solution was filtered through a MF-Millipore™ mixed cellulose ester filter membrane with 0.22 micron pore size supported on a porous frit. The filtration was carried out using either external pressure to force the solution through the MF-Millipore™ membrane or by applying a vacuum to the reverse side of the membrane. After filtration the nanoparticle film dries to a metallic-looking, reflective, coherent film. Other membranes such as polyvinylidine fluoride membranes e.g. Millipore™ Durapore membranes, Whatman Anopore™ membranes can be used. Routinely, 30 mm diameter membranes were used although both smaller (13 mm diameter) as well as larger (e.g. 45 mm, 90 mm or larger diameter) membranes can be readily used. Analogous films were formed from Au2, Au60, Au120 gold nanoparticle solutions, or Ag or Pt nanoparticle solutions. Supported nanoparticles have been made using a variety of water soluble cross-linkers such as 1,2-ethanedithiol, cystamine hydrochloride, substituted viologens, N-methylpyridyl porphyrins, proteins such as bovine serum albumin, polymers such as polyethyleneimine, polyviologens, polylysine.

EXAMPLE 3

Formation of Supported Nanoparticle Films from Organic Solutions

In analogous fashion to that in Example 2, to a solution of Au8 gold nanoparticles in toluene was added 100 µl of a 10 mM solution of an α,ω-alkane-dithiol (such as 1,2-ethanedithiol, 1,4-butanedithiol, 1,8-octanedithiol, 1,15-pentadecanedithiol) in an organic solvent such as toluene or ethanol. The solution was mixed and left to cross-link for 1–30 minutes depending on the rate of cross-linking. During this time the colour of the solution changed from a wine-red colour to a blue-black colour but no visible precipitate had formed. After 10 minutes the solution was filtered through a Millipore™ Durapore membrane (0.22 micron pore size) or a Whatman Anopore™ (20 nm pore size) membrane supported on a porous frit. Routinely, 30 mm diameter membranes were used although both smaller (13 mm diameter) as well as larger (e.g. 45 mm, 90 mm or larger diameter) membranes can be readily used. The filtration was carried out using either external pressure to force the solution through the membrane or by applying a vacuum to the reverse side of the membrane. After filtration the nanoparticle film dries to a metallic-looking, coherent film.

EXAMPLE 4

Conductivity Properties of the Supported Gold Nanoparticle Films (a) Film Conduction vs Film Thickness The thickness of the supported nanoparticle films can be varied simply by varying the quantity of nanoparticle solution that is deposited onto the porous membranes. Thus supported nanoparticle films were formed according to example 2 using cystamine hydrochloride as the cross-linker and varying the volume of Au20 gold nanoparticle solution used from 1 to 10 ml of solution. After film formation, the electrical resistance of the supported nanoparticle film were measured using a Fluke multimeter across a 1 cm² strip of the supported nanoparticle film. The measured resistance (in brackets) for various volumes of gold nanoparticle solutions was: 1 ml (>$10^7$ ohms), 2 ml (>$10^7$ ohms), 3 ml (11500 ohms), 4 ml (160 ohms), 5 ml (45 ohms), 6 ml (63 ohms), 7 ml (19 ohms), 8 ml (16 ohms), 9 ml (14 ohms), 10 ml (9 ohms).

(b) Film Conduction vs Interparticle Distance

Supported gold nanoparticle films were formed according to example 3 using $\alpha,\omega$-alkane-dithiol (such as 1,8-octanedithiol, 1,15-pentadecanedithiol) and 2,2'-dihydroxyethyldisufide. These cross-linkers were used to vary the interparticle spacing from approximately 0.4 nm (2,2'-dihydroxyethyldisufide), 1.2 nm (1,8-octanedithiol) and 2.2 nm (1,15 pentadecanedithiol). After film formation the electrical conduction properties were determined by applying a dc voltage (0–10V) across a 1 cm² strip of the supported nanoparticle film (formed according to the methods of example 2 or 3) and measuring the current using a ADInstruments Pty Ltd Powerlab potentiostat in a two terminal configuration. Resistance values (in brackets) were 2,2'-dihydroxyethyldisufide (200 ohm), 1,8-octanedithiol (1.8 Mohm) and 1,15 pentadecanedithiol (140 Mohm). These results indicate that the nanoparticles that make up the film retain their integrity.

(c) Role of Dielectric Environment During Film Formation

The attachment chemistry on the cross-linking molecules and the solvent's dielectric properties also influence the supported nanoparticle film properties. In films formed in aqueous solution, according to Example 2, using water soluble diamine linkers such as 1,2-ethylenediamine, 1,8-diaminotriethyleneoxide and 1,17-diaminohexaethyleneoxide there is no change in resistance of the supported nanoparticle films with increasing linker lengths (between 8–10 ohms/square) indicating that sintering or other structural rearrangements occur such that the films are no longer made up of discrete nanoparticles. The same diamine cross-linker molecules can however be used to form films which change conduction according to cross-linker molecule length, if a low dielectric solvent such as a hydrocarbon solvent for example toluene is used. In these films (formed according to Example 3) there is a clear dependence between linker length and film resistance. Thus resistance of a 1 cm² supported nanoparticle film using 1,2-ethylenediamine cross-linker was 200 ohms, 1,8-diaminotriethyleneoxide cross-linker was 150 kohms and for 1,17-diaminohexaethyleneoxide cross-linker was 4.3 Mohms.

EXAMPLE 5

Formation of Patterned, Hybrid Multilayer Supported Nanoparticle Films

In order to form a patterned supported nanoparticle film a metal, plastic or silicone rubber mask was placed on top of the membrane. Through the application of slight pressure the edge of the mask sealed against the surface of the membrane. The mask had a set of openings in the shape of the desired pattern through which the cross-linked nanoparticle solution was deposited according to Example 2 or 3. After nanoparticle film deposition the mask was removed leaving a patterned nanoparticle film on the membrane. Further nanoparticle films could then be deposited by repeating the process with different masks and/or different nanoparticle solutions. Thus a first Au20 gold nanoparticle film, cross-linked with cystamine hydrochloride according to Example 2, was deposited onto a MF-Millipore membrane through a mask that defined a 1 cm diameter circular area with a small tag at one end. A second nanoparticle film layer consisting in $TiO_2$ nanoparticles (8 nm diameter) that were crosslinked using polyacrylic acid (mol weight 40,000) according to Example 2, was then deposited onto the first Au20 nanoparticle layer through a 1 cm diameter circular mask. A third Au20 gold nanoparticle film, cross-linked with cystamine hydrochloride according to Example 2, was deposited onto the second $TiO_2$ nanoparticle layer through a 1 cm diameter circular mask that had a small tag at the opposite end to that of the first layer. The resulting structure is shown schematically in FIG. 1 in which 12 is the first conductive Au nanoparticle film, 14 is the second $TiO_2$/PAA nanoparticle film, 16 is the second conductive-Au nanoparticle film and 18 are the tags provided on films 12 and 16.

Electrical connections were made to the two small tags of the first and third gold nanoparticle layers and connected to an impedance bridge. The impedance of the trilayer stricture was measured and results are shown in FIG. 2. It was shown in Example 4, that Au20 nanoparticle films formed using cystamine hydrochloride cross-linkers are conductive. Thus the trilayer structure behaves as a capacitor, with the two conductive Au20 nanoparticle films being separated by the insulating $TiO_2$ nanoparticle film. In the absence of the $TiO_2$ nanoparticles or in the absence of the polyacrylic acid crosslinker, a trilayer structure is not formed and the first and third Au20 nanoparticle films form a short circuit.

EXAMPLE 6

Figure 3:
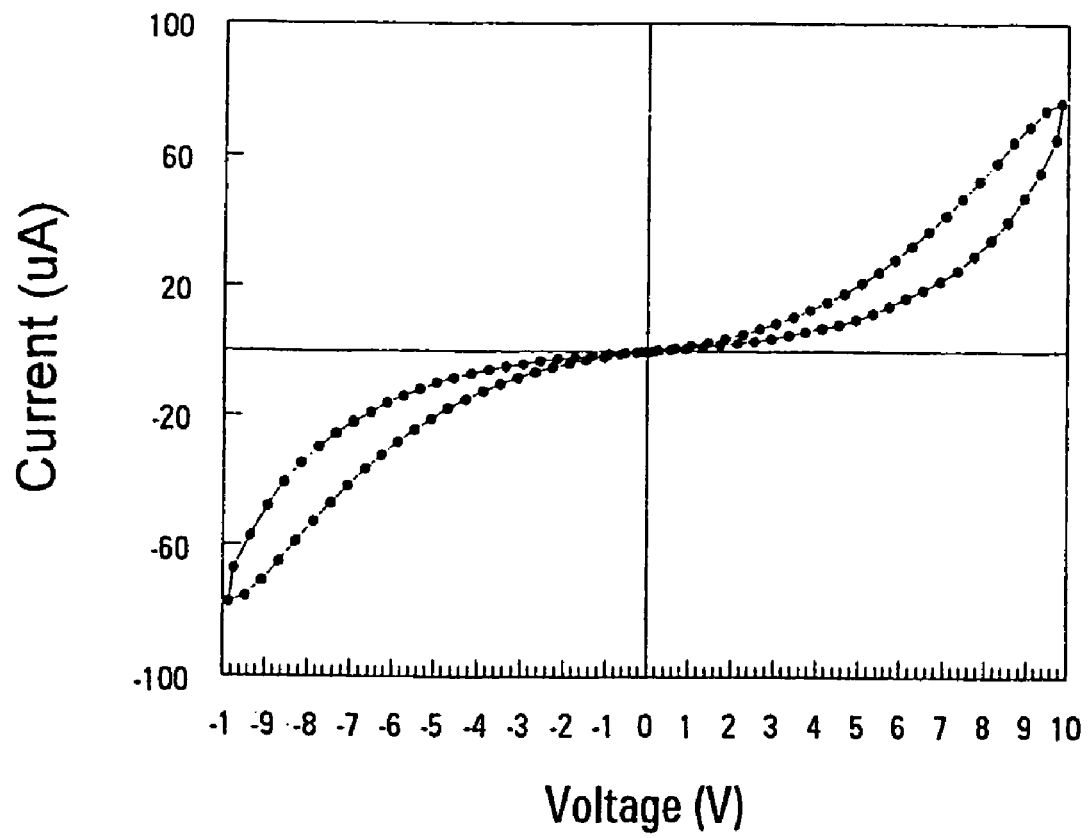

Non-Linear Electronic Properties of Patterned, Multilayer Supported Nanoparticle Films A patterned trilayer nanoparticle film was formed according to example 5 except that the second layer was formed from Au20 gold nanoparticles using bis(10-decanethiol) viologen as the cross-linker, dissolved in a 1:1 mixture of water and ethanol. Films formed from Au20 gold nanoparticles using bis(10-decanethiol) viologen as the cross-linker according to Example 2 showed a resistance of >10 Gohms/square. The current-voltage characteristics of the trilayer architecture was measured between +/−10V and is shown in FIG. 3. The non-linear current-voltage characteristics of the supported nanoparticle films at high electric fields can be clearly seen.

EXAMPLE 7

Light Induced Conductivity Changes in Supported Nanoparticle Films (a) A supported nanoparticle film was formed according to the method in Example 2, using 10 ml of Au20 gold nanoparticle solution and 400 $\mu$l of 10 mM N-methyl viologen in water as the cross-linker on 0.22 micron pore size Millipore Durapore membranes. The nanoparticle film was washed several times with water. A voltage (−250 mV) was applied across a 1 cm$^2$ strip of supported nanoparticle film and the current was monitored in the dark as described in Example 4b. The supported nanoparticle film was exposed to light using a 150 W Xenon lamp and the change in current was recorded. As seen in FIG. 4 a decrease in the current flowing through the nanoparticle film is observed on exposure to light.

(b) A supported nanoparticle film was formed according to the method in Example 2, using 10 ml of Au20 gold nanoparticle solution and a large excess of N-methyl viologen (30 mg) as the cross-linker, on 0.22 micron pore size Millipore Durapore membranes. The nanoparticle film was not washed after film formation. The dark and light current response was measured as in Example 7a and is shown in FIG. 5. As can be seen, in samples with excess viologen a step-like response, decrease in current is seen on exposure of the nanoparticle films towards light. The photoconductivity responses were reversible.

(c) A supported nanoparticle film was formed according to the method in Example 2, using 10 ml of 2 nm mercaptoacetic acid coated gold nanoparticle solution in water (prepared according to the method of Yonezawa T. and Kunitake, T. *Colloids Surfaces A: Physicochem. Eng. Aspects*, 1999, 149, 193) and an excess of N-methyl viologen (20 mg) as the cross-linker, on 0.22 micron pore size Millipore Durapore membranes. The nanoparticle film was not washed after film formation. The dark and light current response was measured as in example 7a at 1V dc bias and is shown in FIG. 6. As can be seen there is an incremental increase in the current on irradiation and subsequent step-like decrease in current in dark condition. Additional photoeffects are seen in FIG. 7 where the same film is irradiated with filtered light of >600 nm wavelength. It can be clearly seen that although the increase in current is again step-like, the profile is different from that obtained for films irradiated with full spectrum light. The photoconductivity responses were reversible.

(d) A supported nanoparticle film was formed according to the method in example 2, using 10 ml of 2 nm mercaptoacetic acid coated gold nanoparticle solution in water (prepared according to the method of Yonezawa T. and Kunitake, T. *Colloids Surfaces A: Physicochem. Eng. Aspects*, 1999, 149, 193) and 1,6-diaminohexane (13 mg) as the cross-linker, on 0.22 micron pore size Millipore Durapore membranes. The dark and light current response was measured as in Example 7a at 1V dc bias. On irradiation with light (either unfiltered light from the Xenon lamp or filtered (>600 nm) light) the current irreversibly dropped from a value of 53 $\mu$A to 11 $\mu$A. Further irradiation or storage in darkness did not change this value.

EXAMPLE 8

Switched Electrical Conduction Change in Response Towards Chemicals

To a solution of Au20 gold nanoparticles (25 ml) was added 250 $\mu$l of a 1% w/v solution of dithiodiglycollic acid in water. The solution was left for 45 min in order to allow the dithiodiglycolic acid to chemisorb onto the gold nanoparticles. It is believed that the Au20 gold nanoparticle solution contains sodium citrate, therefore the dithiodiglycolic acid will be (at least partially) converted to the sodium salt. The gold nanoparticles at this stage do not aggregate (no change in the optical properties observed as would be expected for aggregation). To 10 ml of the above solution is then added sulfuric acid (100 $\mu$l of a 1% v/v solution in water). The gold nanoparticles begin to aggregate as seen by a change in colour from wine-red to blue-black. It is believed that the aggregation is caused by interparticle hydrogen bonding of the carboxylic acid forming a linker with an essentially analyte labile functional group. In the present case the functional group is labile towards basic compounds which disrupt the interparticle cross-linker. After 1 min, the solution is filtered according to the method in example 2 onto Millipore Durapore membranes. A 1 cm by 0.2 cm strip of the supported nanoparticle film is placed in a gas flow chamber with the two ends of the nanoparticle film connected to a ADInstruments Pty Ltd Powerlab potentiostat in a two terminal configuration. The electrical conduction properties were monitored by applying a constant dc voltage (10V) across a 1 cm by 0.2 cm strip of the supported nanoparticle film and measuring the current vs time. At the same time a stream of nitrogen was flowed across the nanoparticle film strip. The response of the nanoparticle strip film conduction was then measured as nitrogen gas containing various analyte gases introduced into the gas flow chamber. The response of the nanoparticle film towards basic analyte gas such as ammonia is shown in FIG. 8. As can be seen the current decreases from 63.2 $\mu$A to a value of 29.9 $\mu$A. The response is reversible. Nanoparticle films formed with non-reactive cross-linkers such as 1,8-octanedithiol show virtually no response towards ammonia gas.

EXAMPLE 9

Microwave Conduction Properties of Nanoparticle Films

Gold nanoparticle films were formed according to the methods outlined in Examples 2 and 3. It was found that the microwave conduction properties of the nanoparticle films largely mirrored the dc conduction properties of the nanoparticle films. Thus highly conductive nanoparticle films formed from 5–20 ml of Au20 gold nanoparticles and cystamine hydrochloride were found to be highly reflective towards microwaves in the 1–10 GHz frequency range. Relatively non-conductive Au8 gold nanoparticle films formed by cross-linking with 1,8-octanedithiol were found to be highly transmissive in the microwave region. Hence it will be possible to modulate the microwave conductivity of the supported nanoparticle films using switchable supported nanoparticle films as described in Examples 6, 7, 8.

EXAMPLE 10

Embossing and Imprinting Patterns Onto Supported Nanoparticle Films

Supported nanoparticle films were formed from 20 ml of Au20 gold nanoparticles cross-linked with 100 $\mu$l of a 1% w/v solution of polyethyleneimine (mol wt 750,000) and MF-Millipore™ 0.22 micron membrane. The film was the sandwiched between a metal base and a metal die that possessed a negative relief structure of the desired structure to be embossed into the nanoparticle film. The nanoparticle film faced the relief structure of the metal die. Pressure was applied to the metal die using a hand press. Relief patterns ranging in size from millimeter, micrometre and nanometre were successfully transferred onto the nanoparticle film. Micron and sub-micron diffraction gratings, as well as holographic images could be embossed onto the nanoparticle film. Additionally it was found that the degree of pressure applied to the nanoparticle film could be used to regulate the specular reflectivity of the films. Gold nanoparticle films could be produced whose the optical properties were visually virtually indistinguishable from those of bulk gold metal films. Additionally, the visual appearance of the nanoparticle films could be varied depending on the type and size of nanoparticle as well as the type of cross-linker used. Thus gold nanoparticle films that were ranging from yellow gold to bronze gold could be produced. Also, contrary to bulk gold film, even though nanoparticle films produced were highly reflective and visually metallic, the electrical conductivity of the films could be varied by orders of magnitude.

EXAMPLE 11

Formation of Electrolytic Capacitors Based on Supported Nanoparticle Films

Nanoparticle films were formed from Au20 gold nanoparticle solution and cystamine hydrochloride according to Example 2. Duplicate supported nanoparticle films were formed from 5, 10, 20, 40 ml of Au20 solution. The duplicates for each Au20 volume were suspended in a 1M $LiClO_4$ aqueous electrolyte solution and the electrochemical impedance spectra (20 mV ac excitation voltage, 10 kHz to 0.1 Hz) were obtained by connecting each of the two films to one terminal of the impedance spectrometer in a standard two electrode measurement. From the impedance spectra the capacitance due to the electrolyte double layer capacitance was obtained. Values of capacitance (in brackets) for each nanoparticle film are 5 ml (311 $\mu$F), 10 ml (500 $\mu$F), 20 ml (1124 $\mu$F), 40 ml (1983 $\mu$F). As can be seen by the linear relationship between the capacitance and the volume of the Au20 nanoparticle solution used to form the capacitors, the percentage of the surface of the nanoparticles that are accessible to the ions from the solution is constant irrespective of the nanoparticle film thickness. The supported nanoparticle films are porous on the molecular(ionic) length scale. Thus high capacitance electrolytic capacitors and/or supercapacitors can be formed using the supported nanoparticle films.

EXAMPLE 12

Formation of Conducting Polymer/Supported Nanoparticle Hybrid Films

Nanoparticle films were formed from 50 ml of Au20 gold nanoparticle solution and cystamine hydrochloride according to Example 2 on a 45 mm diameter Durapore membrane. This supported nanoparticle film was suspended in a solution of freshly distilled pyrrole (0.1M in water), poly(sodium styrenesulfonate) (0.1M with respect to the monomer) and sodium perchlorate (1M). The supported nanoparticle film was connected as the working electrode of a galvanostat using a nickel counter electrode and polypyrrole was deposited into the porous supported gold nanoparticle film at 10 mA for 20 minutes. The gold nanoparticle/polypyrrole hybrid film was rinsed with water and dried. The lustrous black polypyrrole was found to be very adherent to the gold nanoparticle film and could not be removed without destroying the whole film. This is advantageous in a number of applications of conducting polymers where poor adhesion of the conducting polymer to a conducting metallic substrate causes device failure due to delamination of the conducting polymer.

EXAMPLE 13

Use of Conducting Polymer/Supported Nanoparticle Hybrid Films as Redox Activated Linear Actuators Electropolymerised hybrid polypyrole/supported nanoparticle films were formed according to Example 12. Two 3 cm by 0.3 cm strips of the hybrid material were placed back to back such that the polypyrrole/nanoparticle films were facing away from each other. A drop of 1M lithium perchlorate in tetraethylene glycol was then added to saturate the hybrid film and the membrane backing forming a bilayer strip that is connected with an organic electrolyte. Each polypyrrole/nanoparticle film was then connected to one terminal of a square wave pulse generator. A square wave potential of between +/−1 to +/−4V, and lasting between 1–5 seconds per cycle, was then applied to the device. As the polypyrrole goes through the reduction/oxidation cycle extra ions are incorporated/removed from the polypyrrole causing concomitant swelling and shrinkage. The swelling/shrinkage translates as macroscopic movement. The bilayer strip described here undergoes several millimeters of mechanical bending movement with each reduction/oxidation cycle.

EXAMPLE 14

Use of Supported Nanoparticle Films as Linear Actuators Based on Ionic Movement of Ions Nanoparticle films were formed from 50 ml of Au20 gold nanoparticle solution and cystamine hydrochloride according to example 2 on a 45 mm diameter Durapore membrane. Two 3 cm by 0.3 cm strips were placed back to back such that the nanoparticle films were facing away from each other. A drop of 1M lithium perchlorate in tetraethylene glycol was then added to saturate the nanoparticle films and the membrane backing forming a bilayer strip that is connected with an organic electrolyte. Each nanoparticle film was then connected to one terminal of a square wave pulse generator. A square wave potential of +/−4V, and lasting between 1 second to 10 milliseconds per cycle, was then applied to the device. During each cycle on going from + to −4 V (and vice versa) the bilayer strip undergoes several millimeters of mechanical bending movement. Although not wishing to be bound by scientific fact, we believe that this movement is due to an influx/eflux of ions into the porous nanoparticle film causing an increase/swelling of the nanoparticle film that translates into a macroscopic mechanical movement. As the basic mechanism in this case is not based on reduction/oxidation chemistry but on charging/discharging of an ionic double layer surface, the current actuating mechanism has a far faster response time compared to for example actuators based on conducting polymers and also is not subject to the degradation that is common to virtually all redox based systems.

EXAMPLE 15

Formation of Free Standing Nanoparticle Films

Nanoparticle films were formed from 10 ml of Au8 gold nanoparticle solution and 1,8-octanedithiol according to example 3 on a 30 mm diameter Whatman Anopore membrane. The supported nanoparticle film was then placed on top of an aqueous 1M sodium hydroxide solution. The hydroxide solution dissolved the Anopore membrane, leaving the intact crosslinked nanoparticle film floating on the surface of the solution. The nanoparticle film could then be transferred by flotation onto another substrate such as a glass slide or plastic support.

As will be readily recognised by those skilled in the field the nanoparticle films of the present invention have a multiplicity of uses. These uses include use as a sensing device by specific interaction between the detection target and the linker molecule which links two nanoparticles. The detection target may be from the group comprising gases, chemicals, DNA, food, and free radicals, solvents, pharmaceuticals, ions.

use as a selective filter where selectivity is chosen by applying either a positive or negative potential to allow the filtration of negative or positive species, respectively, through the porous nanoparticle film.

use in the formation of electronic devices such as transistors, diodes, capacitors, switches, logic gates.

use in security documents, tags, identification, monitoring, and authetication.

use as a decorative coating on a variety of materials including paper, fabrics, plastics, glass.

use as to form a linear actuator in order to produce macroscopic mechanical movement useful in the formation of artificial muscles or elctromechanical switches.

use as a porous membrane for electro-assisted catalysis, where the nature of the nanoparticle material, the large surface area and optionally the application of electricity may be used to catalyse chemical reactions.

use in energy conversion and storage devices such as photovoltaic cells and capacitors.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of forming a coherent nanoparticle film, the method comprising the following steps:
   (i) adding to a suspension of nanoparticles linker molecules which form cross-links between the nanoparticles to start a cross-linking reaction; and
   (ii) separating the cross-linked nanoparticles from the suspension prior to completion of the cross-linking reaction to obtain a coherent nanoparticle film.

2. A method as claimed in claim 1 in which the cross-linked nanoparticles are separated from the suspension by passing the suspension from step (i) through a porous support prior to completion of the cross-linking reaction to form a coherent nanoparticle film on the porous support.

3. A method as claimed in claim 2 in which the method further comprises the step of separating the nanoparticle film from the porous support.

4. A method as claimed in claim 1 in which the separation is carried out under the influence of external pressure.

5. A method of forming a multilayer film comprising at least two layers of coherent nanoparticle film, the method comprising the following steps:
   (i) adding to a suspension of nanoparticles linker molecules which form cross-links between the nanoparticles to start a cross-linking reaction;
   (ii) passing the suspension from step (i) through a porous support prior to completion of the cross-linking reaction to form a nanoparticle film on the porous support;
   (iii) adding to a further suspension comprising nanoparticles linker molecules which form cross-links between the nanoparticles to start a cross-linking reaction;
   (iv) passing the further suspension from step (iii) through the nanoparticle film of step (ii) and the porous support prior to completion of the cross-linking reaction to form a further nanoparticle film; and
   (v) optionally repeating steps (iii) and (iv).

6. A method as claimed in claim 5 in which the method further comprises the step of separating the multilayer film comprising at least two layers of nanoparticle film from the porous support.

7. A method as claimed in claim 5 in which tile suspension is passed through the porous support under the influence of external pressure.

8. A method as claimed in claim 2 in which there is a release layer positioned between tile porous support and the nanoparticle film.

9. A method as claimed in claim 2 in which the porous support is a filtration membrane.

10. A method as claimed in claim 1 in which the nanoparticles are formed from material selected from the group consisting of superconducting, metallic, semiconducting, insulating, and magnetic materials.

11. A method as claimed in claim 1 in which the nanoparticles are selected from the group consisting of gold, copper, silver, platinum, palladium, iron, cobalt, cobalt-iron alloy nanoparticles.

12. A method as claimed in claim 1 in which the nanoparticles are formed from semiconductor material.

13. A method as claimed in claim 12 in which the nanoparticles are selected from the group consisting of $TiO_2$, CdS, CdSe, ZnS, ZnSe, PbS, ZnO, CdTe, GaAs, InP, Si, indium tin oxide, and fluorine doped tin oxide nanoparticles.

14. A method as claimed in claim 1 in which the nanoparticles are spherical, oblate spheroids, rod shaped or mixtures thereof.

15. A method as claimed in claim 1 in which the nanoparticles are composite core-shell nanoparticles consisting of two or more different materials.

16. A method as claimed in claim 1 in which the nanoparticle is formed of a material such that it responds to an externally applied electric or magnetic field.

17. A method as claimed in claim 1 in which the linker molecules are selected from the group consisting of organodithiols, organodiamines, polymers, proteins, DNA, enzymes, linker molecules containing polymerisable groups, opto-electronically active compounds e.g. viologens, fullerene, pophyrins, chemically reactive molecules such as alkynes, molecules whose terminus can form links between linker molecule, e.g. H-bonding, to form a continuous nanoparticle to nanoparticle linker, phthalocyanines, spyropyrans, azobenzenes, anthracene derivative, fulgides, indigo derivatives, molecules with molecular conductivity properties such as oligo-benzoacetylenes, linear polyaromatic compounds.

18. A method as claimed in claim 1 in which the linker molecule comprises at least two functional groups that bind to the nanoparticles and at least one functional group that changes conformation on exposure to an external stimulus.

19. A method as claimed in claim 1 in which the linker molecule comprises at least two functional groups that bind to the nanoparticles and at least one functional that changes the electronic state of the linker molecule to an external stimulus.

20. A method as claimed in claim 18 in which the external stimulus is selected from the group consisting of ultraviolet, visible, infra-red, microwave, or ionizing radiation, chemical or physical interactions with molecules or ions, pH, reduction/oxidation reactions, electric or magnetic fields.

21. A method as claimed in claim 3 in which at least two of the nanoparticle films of the multi-layer film comprise differing nanoparticles or linkers such that the multi-layer film has non-linear conduction properties.

22. A method as claimed in claim 1 in which following formation of the coherent nanoparticle film a die having feature sizes ranging from centimeter to nanometre is contacted with the nanoparticle film and transfers an imprint or embossed structure onto the nanoparticle film.

23. A coherent nanoparticle film produced by the method as claimed in claim 1.

24. A nanoparticle film comprising a three dimensional cross-linked array of nanoparticles and linker molecules in which the nanoparticle film is coherent, robust and self supporting.

25. A nanoparticle film as claimed in claim 24 in which the nanoparticles are formed from material selected from the group consisting of metallic, semiconducting, insulating, and magnetic materials.

26. A nanoparticle film as claimed in claim 24 in which the nanoparticles are selected from the group consisting of gold, copper, silver, platinum, palladium, iron, cobalt, cobalt-iron alloy nanoparticles.

27. A nanoparticle film as claimed in claim 24 in which the nanoparticles are formed from semiconductor material.

28. A nanoparticle film as claimed in claim 24 in which the nanoparticles are selected from the group consisting of $TiO_2$, CdS, CdSe, ZnS, ZnSe, PbS, ZnO, CdTe, GaAs, InP, Si, indium tin oxide, and fluorine doped tin oxide nanoparticles.

29. A nanoparticle film as claimed in claim 24 in which the nanoparticles are spherical, oblate spheroids, rod shaped or mixtures thereof.

30. A nanoparticle film as claimed in claim 24 in which the nanoparticles are composite core-shell nanoparticles consisting of two or more different materials.

31. A nanoparticle film as claimed in claim 24 in which the linker molecules are selected from the group consisting of organodithiols, organodiamines, polymers, proteins, DNA, linker molecules containing polymerisable groups, enzymes, opto-electronically active compounds e.g. viologens, fullerene, pophyrins, chemically reactive molecules such as alkynes, molecules whose terminus can form links between linker molecule, e.g. H-bonding, to form a continuous nanoparticle to nanoparticle linker, phthalocyanines, spyropyrans, azobenzenes, anthracene derivative, fulgides, indigo derivatives, molecules with molecular conductivity properties such as oligo-benzoacetylenes, linear polyaromatic compounds.

32. A nanoparticle film as claimed in claim 24 in which the linker molecule comprises at least two functional groups that bind to the nanoparticles and at least one functional group that changes conformation on exposure to an external stimulus.

33. A nanoparticle film as claimed in claim 24 in which the linker molecule comprises at least two functional groups that bind to the nanoparticles and at least one functional that changes the electronic state of the linker molecule to an external stimulus.

34. A nanoparticle film as claimed in claim 32 in which the external stimulus is selected from the group consisting of ultraviolet, visible, infra-red, microwave, or ionizing radiation, chemical or physical interactions with molecules or ions, pH, reduction/oxidation reactions, electric or magnetic fields.

35. A multi-layer film comprising at least two of the nanoparticle films as claimed in claim 24 in which of the differing nanoparticles or linkers are such that the multi-layer film has non-linear conduction properties.

36. A nanoparticle film as claimed in claim 24 in which the nanoparticle film has imprinted or embossed thereon a structure.

37. A nanoparticle film as claimed in claim 24 in which the nanoparticle film is positioned on or within a solid substrate.

38. A nanoparticle film as claimed in claim 37 in which the solid substrate is a banknote, credit card or security card.

* * * * *

UNITED STATES PATENT AND TRADEMARK OFFICE
CERTIFICATE OF CORRECTION

PATENT NO. : 6,984,265 B1 Page 1 of 1
APPLICATION NO. : 10/089820
DATED : January 10, 2006
INVENTOR(S) : Raguse et al.

It is certified that error appears in the above-identified patent and that said Letters Patent is hereby corrected as shown below:

On the Title Page

(56) References Cited         Delete duplicate reference "AU 29947/99 A1  9/1999"
Foreign Patent Documents

(56) References Cited         Delete duplicate reference "DE 19741496 A  3/1999"
Foreign Patent Documents

In the Claims

Column 17, line 1, Claim 19    After "functional",
                               Insert --group--

Column 18, line 21, Claim 33   After "functional",
                               Insert --group--

Column 18, line 31, Claim 35   Delete "which of",
                               Insert --which--

Signed and Sealed this

Sixth Day of February, 2007

JON W. DUDAS
*Director of the United States Patent and Trademark Office*